Figure 1:
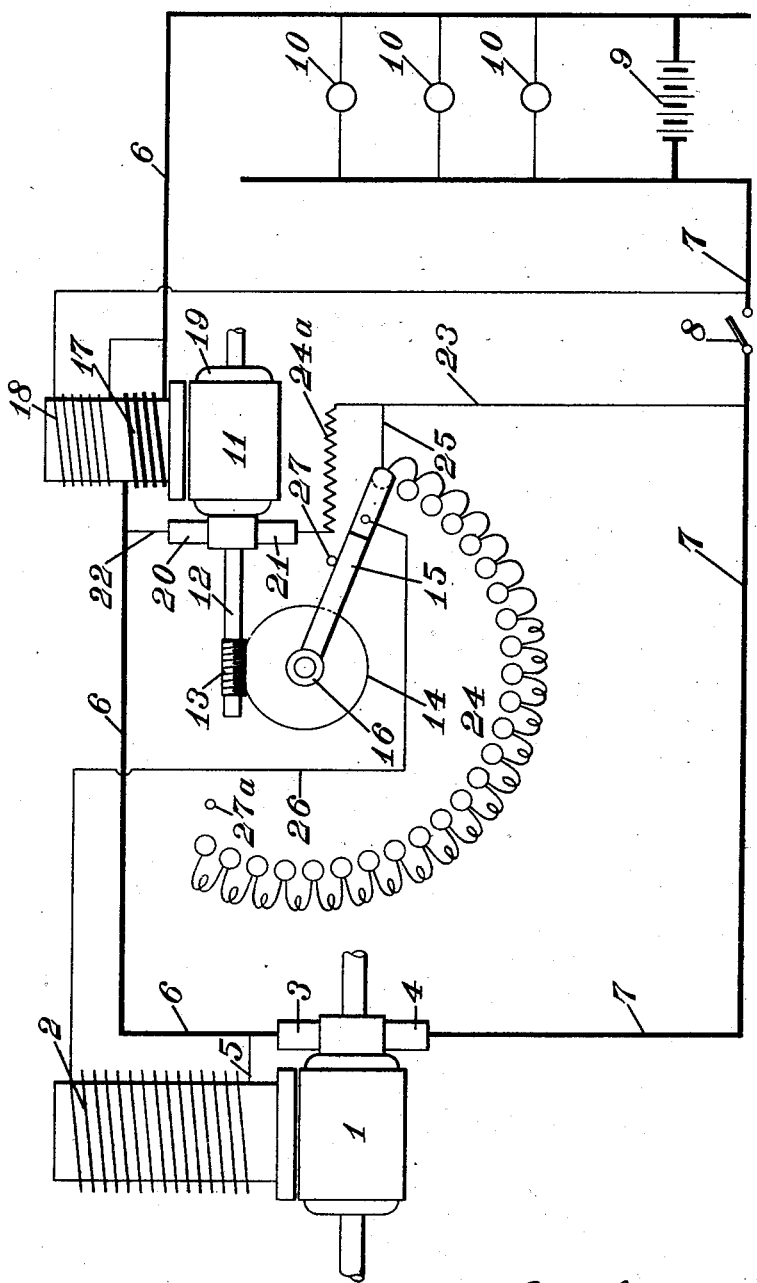

No. 720,674. PATENTED FEB. 17, 1903.
J. L. CREVELING.
SYSTEM OF ELECTRICAL DISTRIBUTION.
APPLICATION FILED FEB. 12, 1902.
NO MODEL. 2 SHEETS—SHEET 1.

WITNESSES:
E. J. Schroeder, Jr.
Conrad Krump

John L. Creveling
INVENTOR.
BY
ATTORNEYS.

No. 720,674. PATENTED FEB. 17, 1903.
J. L. CREVELING.
SYSTEM OF ELECTRICAL DISTRIBUTION.
APPLICATION FILED FEB. 12, 1902.
NO MODEL. 2 SHEETS—SHEET 2.
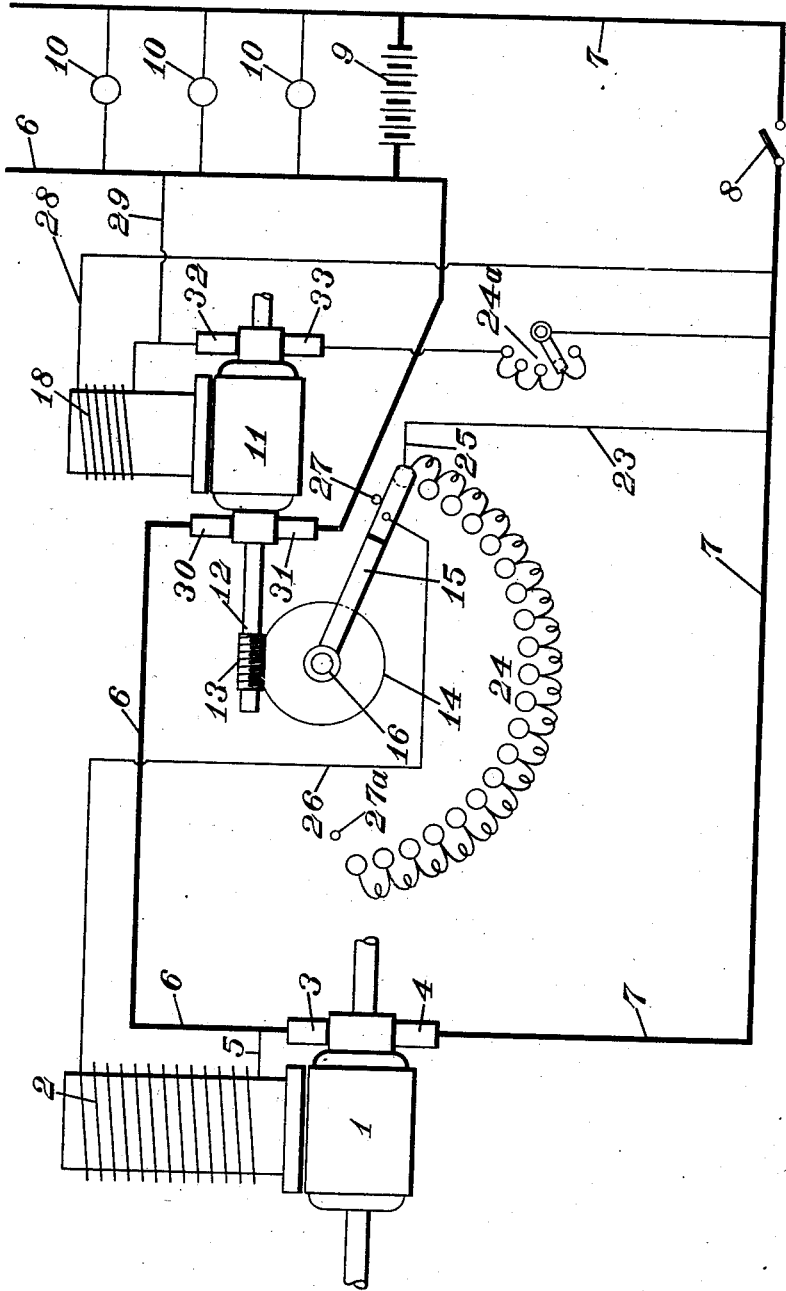
Fig. II.
WITNESSES:
E. J. Schroeder, Jr.
Conrad Krump
John L. Creveling
INVENTOR.
BY
Kennison Cum Finley Rubino
His ATTORNEYS

UNITED STATES PATENT OFFICE.

JOHN L. CREVELING, OF NEW YORK, N. Y.

SYSTEM OF ELECTRICAL DISTRIBUTION.

SPECIFICATION forming part of Letters Patent No. 720,674, dated February 17, 1903.

Application filed February 12, 1902. Serial No. 93,773. (No model.)

*To all whom it may concern:*

Be it known that I, JOHN L. CREVELING, a citizen of the United States, and a resident of the borough of Manhattan, city, county, and State of New York, have invented certain new and useful Improvements in Systems of Electrical Distribution, of which the following is a specification.

My invention relates to systems of electrical distribution.

As the invention is primarily directed to car-lighting systems, it will be described with particular reference thereto, it being understood, however, that the invention is not limited to car-lighting systems.

The invention has for its principal object to produce means whereby the current output of a generator driven at variable speed may be kept practically constant without regard to the speed variations, said system being shown in the present instance as comprising a small regulating-motor, whose direction of rotation and consequent insertion or withdrawal of resistance in the field-circuit is dependent directly upon the output of the generator.

In the accompanying drawings I have shown two forms or constructions of devices in which my invention is illustrated. These figures are diagrammatic merely, but are sufficient to enable one skilled in the art to which the invention pertains to make and use said invention.

In the drawings, Figure I is a diagrammatic view of a car-lighting system in which my invention is embodied, and Fig. II is a similar view of a modification thereof.

Similar numerals of reference indicate similar parts in both figures.

In the drawings, 1 indicates a generator, shown in the present instance as provided with a shunt-winding 2. The brushes are numbered 3 4, the brush 3 being considered for the purposes of this description as the positive brush, and 4 as the negative brush. One end 5 of the shunt 2 is connected with the main 6, leading from the positive brush, the other through a resistance device 24 with main 7, leading from the negative brush, the line-switch 8 being interpolated in the main 7. A storage battery 9 is normally in circuit with the mains, and in the present instance lamps 10 have been shown as normally in circuit with the mains. A small regulating-motor 11 is provided. This motor 11 is shown as provided with a shaft 12, having thereon a worm 13, engaging with a gear 14, having an arm 15 secured thereto by frictional connection 16. The regulating-motor is shown in Fig. I as having a double field-winding— one winding 17 being in series in the generator-main circuit and the other winding 18 in this instance receiving its current from the batteries 9. Obviously any other source of sufficiently uniform electromotive force may be utilized. It will be observed that these windings 17 18 oppose each other and for a purpose presently to be explained. The armature 19 of the regulating-motor is provided with suitable windings, which are put in circuit with the generator-mains by brushes 20 21, the brush 20 being connected by the wire 22 with the main 6 and the brush 21 being connected by the wire 23, through the resistance 24$^a$, with the main 7. This resistance 24$^a$ may be a variable resistance, as shown in Fig. II of the drawings. A suitable rheostat or variable resistance 24 is connected by wire 25 to the wire 23. This rheostat is adapted to coöperate with the arm 15, which is connected by wire 26 with the shunt-coil 2 of the generator. Pins or other stops 27 and 27$^a$ may be provided for the arm 15. The windings of the regulating-motor are such that when its armature is energized by current, as from the generator 1, when only the battery-current is circulating through the shunt 18, the tendency of the motor 11 is to hold the arm 15 firmly against the stop 27. Let it be supposed that the normal voltage of the line is intended to be sixty volts and that at an output of twenty amperes the coils 17 18 balance each other. If the machine be started up, the arm 15 will be against its stop 27 and the machine will be receiving full field. The armature 19 of the regulating-motor will, when the generator has begun to deliver current, receive current from the generator - mains, and when the generator has reached the proper voltage—let us say sixty volts—the line-switch 8 will close in a well-understood manner, and thereupon the field-winding 17 of the regulating-motor will begin to receive whatever current is delivered to the battery or translating devices by the generator. As the current rises in the field-winding 17 this field-winding 17, which is opposed to the winding 18, will alter the magnetization of the field of the regulating-motor, and when the current in the winding 17 becomes strong enough to overcome the effect of the current in the winding 18 the direction of the rotative tendency of the regulating-motor will be reversed, and as the field-winding 17 overpowers the field-winding 18 the motor will rotate to step the rheostat-arm 15 over the contacts of the rheostat, thereby cutting down the field and varying the output of the generator until the coils 17 18 practically balance each other, whereupon the rheostat and regulator-motor will remain stationary until a further change in the line conditions. It being remembered that the system of distribution shown is adapted for use in train-lighting, where owing to the variable speed of the train the generator will be driven at variable speed, it will be seen that notwithstanding the variations of the speed of the generator in connection with storage batteries its output will be held practically constant, it being understood that when the output decreases owing to a decrease of speed the decrease of current in coil 17 will destroy the balance and start the rheostat-arm 15 back to reduce the field resistance.

In Fig. II, I have shown a modified form of my construction in which, so far as possible, figures of reference have been employed similar to Fig. I. In this figure the regulator-motor 11 is provided with a single field-winding 18, which, as shown in the present instance, is in shunt to the batteries when the switch 8 is closed, the connections being made by the wires 28 29. The armature of the regulator-motor is provided with opposing windings, one winding being in series with the line through brushes 30 31 and the other winding being in shunt with the line through brushes 32 33. One of these armature-windings is or may be provided with a suitable resistance 24ᵃ, shown in this figure as a variable resistance. This form of regulator operates in a manner similar to the form shown in Fig. I, the normal tendency of one winding of the armature being to hold the switch-arm 15 against the stop-pin 27 and the opposing armature-winding tending to bring about the balance, so as to set the arm 15 of the rheostat at a point which will give the generator a proper field in order to regulate the output irrespective of the variability of the speed of the generator.

In each of the devices shown in the drawings it will be noticed that the generator is governed by an electric motor device in which an independently-determined magnetomotive force is opposed by a magnetomotive force which is a function of the current generated, thus producing a resultant magnetic field the polarity of which is dependent upon the current generated and in which there is exposed to the action of the resultant field a member tending to set up an independent magnetic field, thereby producing motion in a positive or negative direction, the said motion causing the generator to be regulated as desired.

Having described my invention, what I claim, and desire to secure by Letters Patent, is—

1. In a system of electrical distribution the combination of a generator, a regulator-motor therefor, the said regulator-motor being provided with windings and means whereby the magnetomotive forces of said windings oppose each other and tend to reverse the direction of magnetic flux and means whereby, when the windings are out of magnetic balance, the output of the generator will be automatically varied and means whereby variation in the output of the generator disturbs the magnetic balance of said windings.

2. In a system of electrical distribution the combination of a generator, a variable resistance governing the output of the generator, a motor governing the variable resistance and having a winding in series with the generator and a magnetically-opposing winding, the resultant magnetic effect of which governs the motor, and means whereby said winding causes the motor to vary the resistance in accordance with the output of the generator.

3. In a system of electrical distribution the combination of a generator, a variable resistance governing the output of the generator, a motor governing the variable resistance and embodying a plurality of opposed windings and means whereby the resultant magnetic flux by change in direction determines the direction of movement of the motor.

4. The combination of a generator with an electrical regulator comprising two coöperating members, one having a winding causing a magnetomotive force in constant direction, the other having a plurality of windings causing a resultant magnetic flux, the direction of which is dependent upon the current to be regulated, and means whereby the direction of the said resultant magnetic flux determines the output of the generator.

5. The combination of a generator and its field, of a regulator comprising a motor whose rotation governs said field, said motor comprehending a plurality of windings, one of which is traversed by a suitable independent current and another of which is traversed by a current to be regulated, and means whereby the resultant magnetic flux of said windings determines the direction of movement of the regulator-motor.

6. In a system of distribution the combination of a generator, an electric regulator-motor controlling the output of the generator comprehending a plurality of windings, two of which are traversed by predetermined currents, and means whereby another of the windings by opposing the magnetomotive force of one of the above windings determines the operation of the motor and means operated by the motor for regulating the output of the generator.

7. A system of distribution comprising a generator, a regulator-motor governing the output of the generator having two windings traversed by predetermined currents forming means which tend to increase the output of the generator and also having a winding in circuit with the generator and means whereby said winding, by opposing the magnetomotive force of one of the above windings, tends to cause the output to be decreased.

8. A system of distribution comprising a generator and an external circuit and a regulator-motor having windings, two of which magnetically oppose each other, and a rotating member, the said rotating member having a winding in the magnetic field of the above-named windings forming means tending to rotate said member to cause a magnetic balance to be set up and preserved between two of the windings.

9. A system of distribution including a generator and an external circuit and a regulator-motor controlling the output of the generator, said regulator-motor having windings magnetically opposing each other, and means normally tending to cause the motor to establish a balance of magnetomotive force of said windings and means unbalancing the windings by a change of output of the generator.

10. A system of distribution comprising a generator and a regulator-motor governing the output of the generator having two windings and means whereby the magnetomotive forces of said windings tend to cause the motor to increase the output of the generator and having a winding in circuit with the generator and means whereby the magnetomotive force of this winding by opposing one of the above-named magnetomotive forces tends to cause the motor to decrease the output.

11. The combination with a generator and a regulator therefor having a movable member the movement of which varies the output of the generator, of means moving the said member, comprising a winding which alone is ineffective to cause said member to move and a plurality of opposed windings and means whereby the resultant magnetic field of said windings acting with the above-named winding tends to cause the movable member to move to increase or diminish the output of the generator.

12. In a system of distribution, means regulating a generator, comprehending means creating an independently-determined magnetomotive force, means creating an opposing magnetomotive force which is a function of the current generated and thus producing a resultant magnetic field whose polarity is dependent upon the current generated, means exposed to the influence of the above-named resultant magnetic field tending to set up an independent magnetic field, producing motion in a positive or negative direction dependent upon the polarity of the resultant magnetic field and means whereby said motion in one direction increases the output of the generator and in the other direction decreases the said output.

13. In a system of distribution means regulating a dynamo or generator, comprehending means setting up a resultant magnetic field by a difference in effect between a magnetomotive force which is a function of the current generated and an independently-determined magnetomotive force and means whereby the action of another magnetomotive force exerting its influence upon the magnetic field causes a rotary member to so rotate as to affect the regulation of the generator.

14. Means regulating a generator, comprehending means creating a resultant magnetic field, the strength and polarity of which is determined by the action of a magnetomotive force which is a function of the current generated and a predetermined magnetomotive force and means acting upon the said magnetic field with another magnetic field and means whereby the action of the last-named field and the resultant magnetic field produces mechanical motion in either of two directions and means whereby such motion affects the regulation of the output of the generator.

15. Means regulating a generator or dynamo, comprehending means creating a resultant magnetic field by the combined effect of a magnetomotive force which is a function of the current generated and an independent magnetomotive force, means whereby the resultant flux acting upon another magnetomotive force produces mechanical motion in either of two directions and means whereby such mechanical motion regulates the output of the generator.

16. Means regulating the output of the generator which comprehends means producing mechanical motion in either of two directions by the combined action of a flux which is the resultant effect of a magnetomotive force which is a function of the current generated and an independent magnetomotive force and another flux and means whereby such mechanical motion governs the generator.

JOHN L. CREVELING.

Witnesses:
F. E. KESSINGER,
GEO. E. MORSE.